United States Patent [19]

Nemec

[11] 3,889,519

[45] June 17, 1975

[54] METHOD AND APPARATUS FOR TESTING THE FUSION WELDABILITY OF METALLIC MATERIALS

[75] Inventor: Josef Nemec, Prague, Czechoslovakia

[73] Assignee: Ceske vysoke uceni technicke, Prague, Czechoslovakia

[22] Filed: July 9, 1973

[21] Appl. No.: 377,416

[52] U.S. Cl. .............................................. 73/15 R
[51] Int. Cl. ........................................... G01h 25/72
[58] Field of Search .................. 73/15 R, 15.4, 104; 219/124

[56] References Cited
UNITED STATES PATENTS

| | | | |
|---|---|---|---|
| 2,330,599 | 9/1943 | Kuehni | 73/15 |
| 3,020,745 | 2/1962 | Sielicki | 73/104 |
| 3,126,472 | 3/1964 | Brems | 219/124 |
| 3,206,603 | 9/1965 | Mauro | 73/15 |
| 3,306,116 | 2/1967 | Ross et al. | 219/124 |

Primary Examiner—Herbert Goldstein

[57] ABSTRACT

Method of and an apparatus for testing the fusion weldability of metallic materials by determining their tendency for hot cracking. The specimen is partly melted by means of a welding arc or the heat source in such a way as to obtain a weld bead. During this procedure, the welding speed is appropriately changed while the heat output of the source remains unchanged. The device is provided with the heat source and with a driving mechanism designed to move the heat source with variable speed while forming the weld bead.

The effect of the method, according to the invention, is usually a simple test of a single specimen of the simplest shape and of small dimensions and consequently of low weight, proves sufficient for performing the test.

8 Claims, 19 Drawing Figures

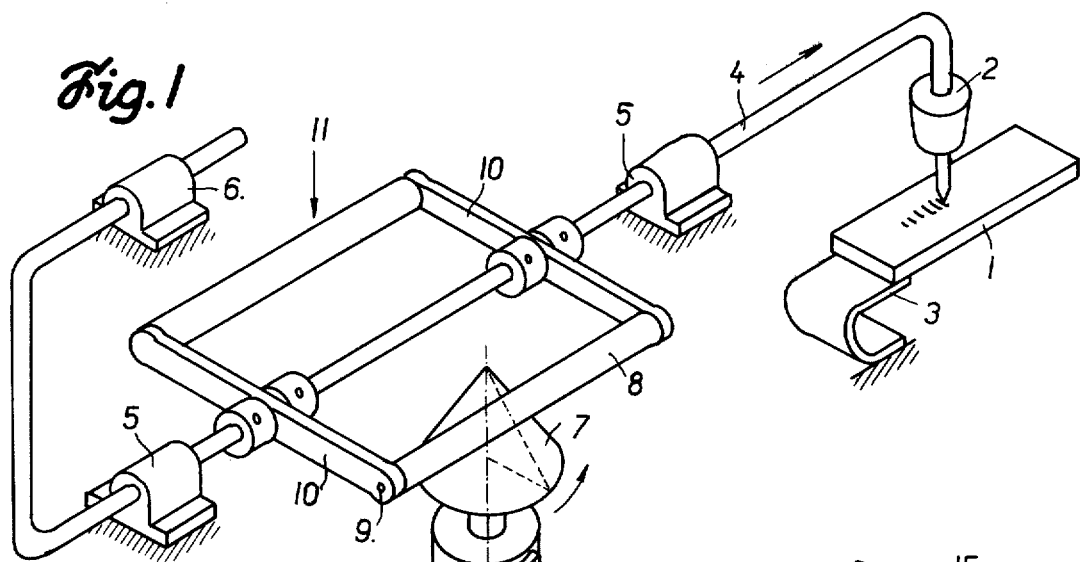
Fig.1
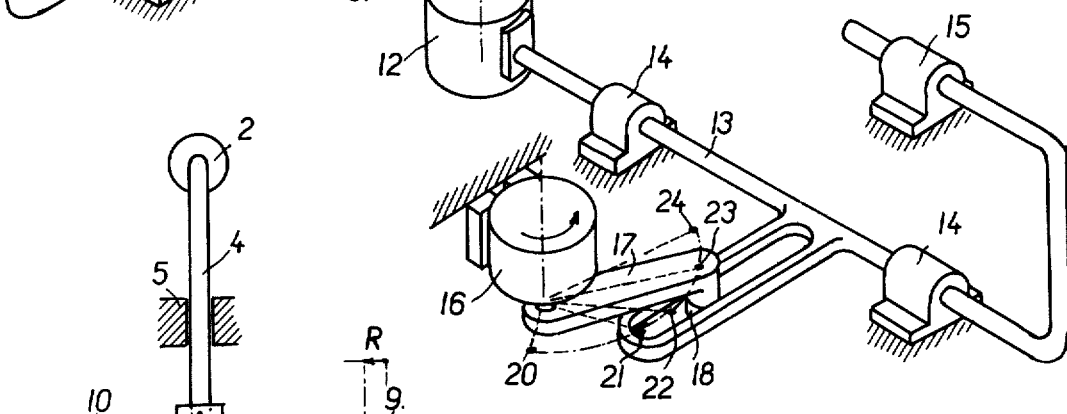
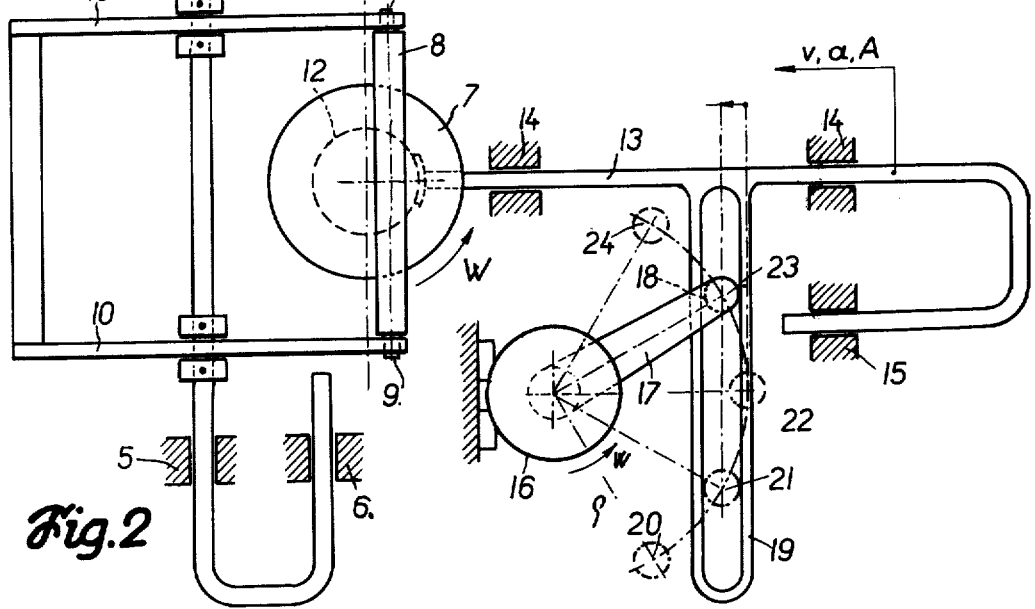
Fig.2

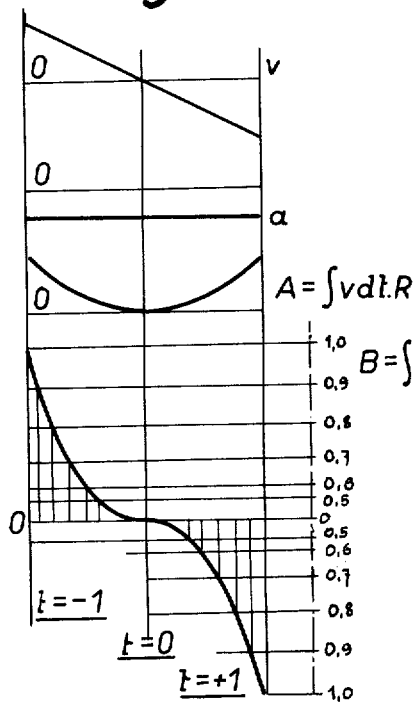
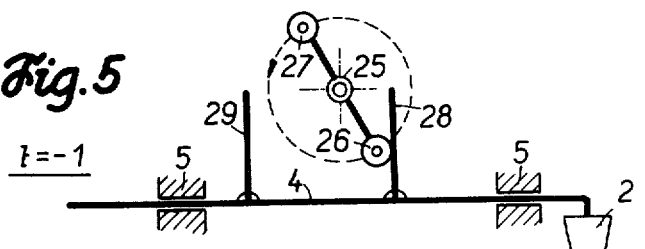
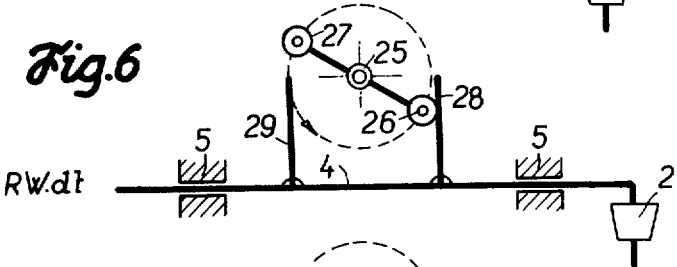
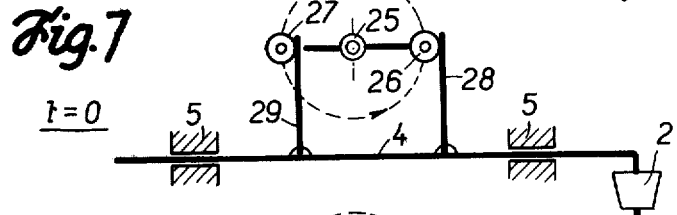
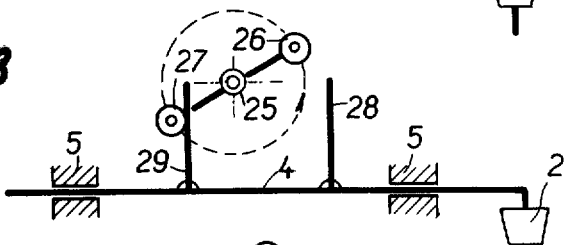
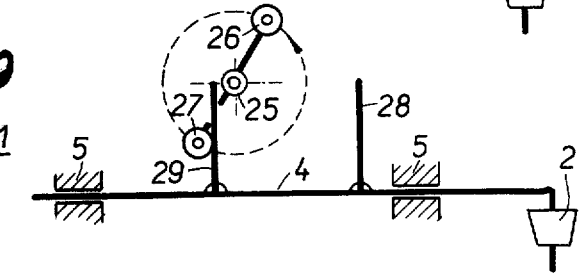
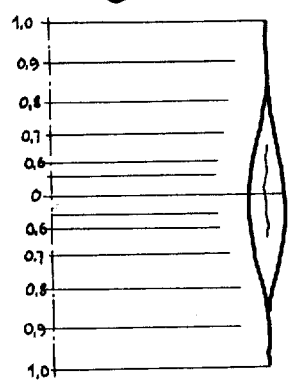
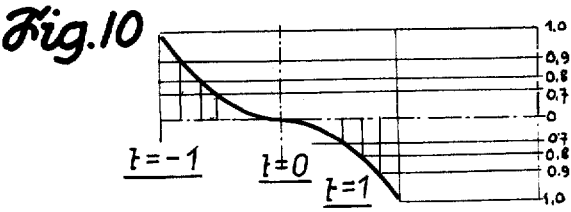
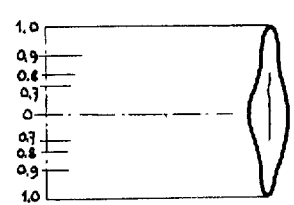

METHOD AND APPARATUS FOR TESTING THE FUSION WELDABILITY OF METALLIC MATERIALS

The invention refers to a method of and an apparatus testing the fusion weldability of metallic materials by determining their tendency for hot cracking. The weldability of base materials is clearly revealed when they are welded without the use of any filler materials, the base metal itself serving as weld metal. Many weldability tests are based upon this principle. In these tests, the base material is first submitted to a welding process, then it is carefully examined for the presence of hot cracks and their extent determined. For the following reasons, however, these tests are not widely applied:

A considerable amount of material, on the order of some kilograms, is needed for carrying out the above tests. Many of them are very time-consuming and arduous, the preparation requiring much machining. The welding procedure itself together with that of the evaluation process, requires much time, since it is necessary to cut out the test welds, to adjust them in the workshop, and carefully to examine the metallographic specimen in the laboratory. Some of the test methods require the use of expensive and complicated mechanisms by means of which the test body is distorted during the welding process. A lot of special knowledge is also needed for the operation of such devices. With all that, the tests often supply but little conclusive evidence, and the period between securing the test material and obtaining the required test results is often so long that the result is of no practical use for the manufacturing process involved.

It is to be noted that with known tests of this kind both the welding speed and the specific heat supply are kept constant throughout the test. This is practised even in cases where the welding speed is zero all during the test so as locally to "spot weld" the base material.

The above shortcomings are eliminated by the method weldability testing according to the present invention. The specimen is partly melted by means of a welding arc or other heat source in such a way as to obtain a weld bead, during this procedure, the welding speed is appropriately changed while the heat output of the heat source remains unchanged. The device is provided with a heat source and with a driving mechanism designed to move the heat source with variable speed while forming the weld bead.

The method, according to the invention, usually requires only simple test of a single specimen of the simplest shape and of small dimensions and consequently of low weight.

An almost insignificant amount of material is needed for the test, the specimen having e.g. the shape of a rectangular prism of 5 × 35 × 80 mm. The preliminary work is a minimum as it is reduced to the smoothing of one of the plane surfaces of the specimen. Specimens made from a sheet or plate have sufficiently plane surfaces, and it is necessary only to clean one of them. Otherwise, no machining is needed. Only 10 to 20 seconds are needed for producing the bead. No further machining of the specimen is needed; the evaluation requires only a careful examination of the specimen through a magnifying glass. This is done as soon as the specimen has cooled down. No mechanisms for forcibly deforming the specimen during welding are needed. Fractional horsepower motors suffice for traversing the burner. Test parameters found by preliminary experiments render it possible for the tests to embrace a wide range of hot cracking tendencies and to furnish accurately reproducible results. These tests may even be applied to large semi-finished products, such as pipes, forgings, and the like. It is not necessary to prepare any special test body. It is sufficient to choose a suitable place upon the part to be examined, to smooth the place and to put the piece in such a position as to dispose the chosen surface horizontally and then to carry out the welding and to examine it. It is advisable to choose the place in such a way as to prevent the weld bead produced from being in the way, or so that it can be removed, if necessary, for instance, by grinding. As the weld is formed by an automatically operating mechanism and as the method is the same every time no subjective influence needs to be taken into account, such as the skill of the welder, his physical or mental state or the like.

A test, according to the invention, proceeds in the following way. A welding arc serves to produce the weld bead, in a known way, upon the material to be examined. It is advisable to proceed without the use of a filler. The arc burns between an infusible tungsten electrode and the material to be tested. The arc is protected in a suitable way, e.g. by an inert argon atmosphere. Before starting the test, the electrode is adjusted to be a suitable distance from the base material. Then the arc is struck (e.g. with a high frequency spark) and, at the same time, the welding burner is put into motion.

For melting on the base material in such a way as to form a weld bead, it is also possible to use heat sources other than the electric arc, e.g. flame or plasma.

According to the invention, the welding speed, i.e. the speed of the burner moved forward above the surface of the body to be tested, changes with the length of the trajectory covered by the burner. Thus the welding speed is also a function of time, i.e. it changes with time. For changing the welding speed during the test, the following principles have proved suitable: The welding speed first decreases from its initial value and, having reached a minimum which may also be zero, rises until it reaches a maximum at which moment the test is stopped by extinguishing the arc and, usually, by also stopping the motor of the burner. Another possibility consists in increasing the welding speed from its initial point until it reaches a maximum, whereupon the experiment is stopped. In this case the initial speed may be zero.

The weld bead formed in this way has a variable width and varies also with respect to the depth of its penetration along its length. The width and depth of melting and, consequently, the cross section of melting are greatest at places where the welding speed was lowest and vice versa. From the fact that these conditions vary within the length of one and the same test bead bead, a wide range of conditions results, which are able to induce the formation of hot cracks during the formation of the bead.

Hot cracking tendencies signify bad weldability and manifest themselves, in this case, by the formation of longitudinal cracks. The length of the cracks can be determined by observing them through a magnifying glass having a 10 to 50 × magnification. Of course, other methods of discovering hair cracks in the metallic material may also be used. When the tested material is highly prone to hot cracking, transverse cracks may also be found in the weld bead.

In what follows, the method and the device according to the invention will be described in detail by way of examples.

In the drawings:

FIG. 1 is a diagrammatic view of the whole device;

FIG. 2 is a schematic view of the driving mechanism;

FIG. 3 is a graph showing geometric and kinematic relations of parts of the apparatus;

FIG. 4 is a view showing the shape of a weld bead having a crack;

FIG. 5 is a schematic view of an alternative design of the driving mechanism;

Figure 12:
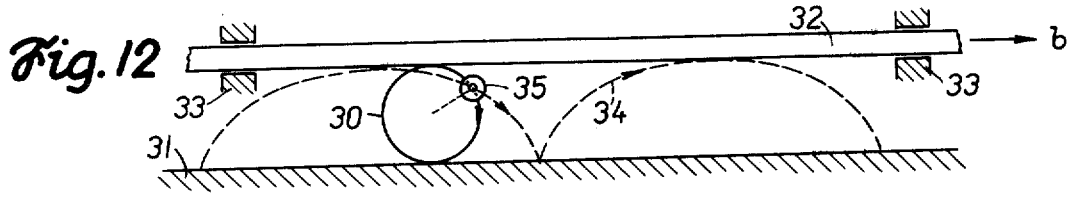
Figure 13:
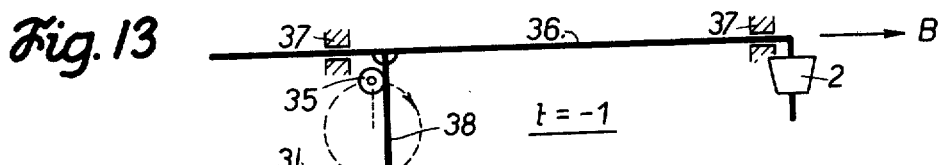
Figure 14:
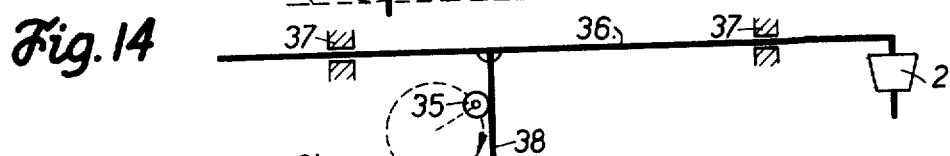
Figure 15:
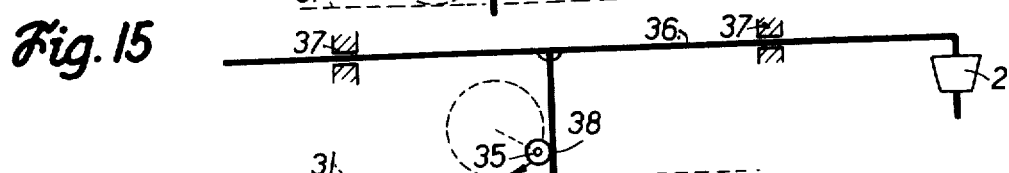
Figure 16:
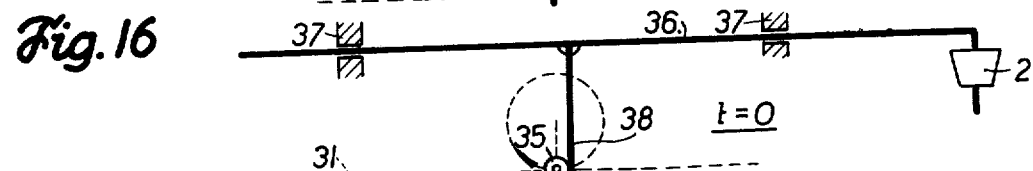
Figure 17:
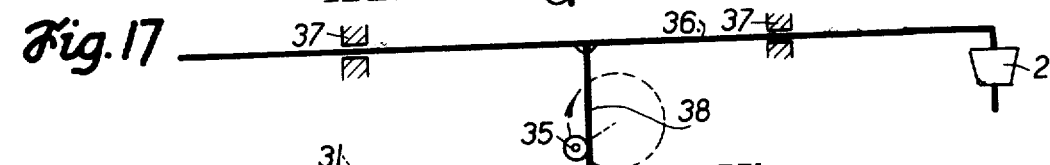
Figure 18:
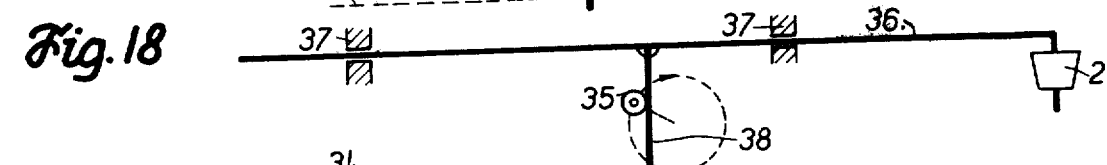
Figure 19:
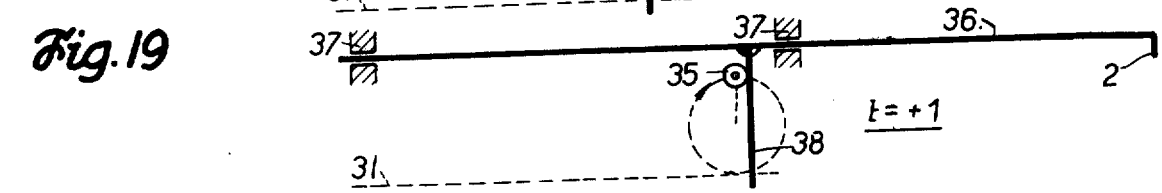

FIGS. 6 to 9, including, show individual stages in a cycle of the driving mechanism;

FIG. 10 is a graph showing the trajectory of the burner as a function of time;

FIG. 11 shows the shape of a weld bead having a crack; and

FIGS. 12 to 19, including, illustrate other alternative designs of the driving mechanism showing the individual successive positions of the parts thereof.

The test body or specimen 1 is melted by the arc of a welding burner 2 of current design. The specimen 1 is supported by a holder 3. The burner 2 is attached to a shifting bar or slidable rod 4 which is supported by guide boxes 5 enabling the bar to be displaced along the weld. A bushing 6 prevents the bar from rotating so as to prevent the burner from being deflected from its prescribed rectilinear path.

The bar 4 is driven in the direction of the arrow by a rotating conical friction wheel 7, this motion being taken from the wheel 7 by a cylindrical pressure bar 8. The bar is free to rotate around its longitudinal axis in bearings 9. The bearings 9 are supported by a pair of arms 10 which can swing about the axis of the shifting bar 4 and which, at the same time, transfer the rectilinear motion, taken from the friction wheel 7, to the movable bar 4. The frictional contact between the pressure bar 8 and the wheel 7 can be released by raising the pressure bar 8. This is performed by hand by applying the necessary force in the direction of the arrow 11. This has to be done when adjusting the functioning of the device and when preparing a new experiment. When the force in the direction of the arrow 11 ceases to act, the pressure bar 8, due to its own weight, again contacts the surface of the wheel 7 which is sufficient to give rise to the necessary frictional force.

The wheel 7 is driven by a motor 12 which has a constant, suitably chosen, speed of rotation. This motor 12, together with the wheel 7, can be shifted perpendicularly to the bar 8, the purpose being to change the radius of effective contact upon which the shifting speed of the pressure bar 8 depends, i.e. that of the burner 2.

The motor 12 is supported by another shifting bar 13 which is displaceable in fixed boxes 14. Once more, guide box 15 prevents the bar 13 from being rotated, and thus prevents the motor 12 from being deflected. If the bar 13 is at rest, the motor 12 and the center of the wheel 7 remain in the same relative position, hence the effective contact radius between the wheel 7 and the pressure bar 8 does not change. When the shaft of the motor 12 rotates with a constant angular speed, the pressure bar 8 and the shifting bar 4 as well as the burner 2 are displaced in forward direction with a constant speed.

If the bar 13 is displaced in the guide boxes 14, the center of the wheel 7 approaches the axis of the pressure bar 8, or it moves away, and the speed of relative shifting of the pressure bar 8, the slidable rod 4 and the burner 2 changes with time. If the motor 12 and the wheel 7 are displaced, by means of the bar 13 to such a position that the pressure bar 8 engages the very center of the wheel 7, then the effective contact radius is zero and the pressure bar 8 is not displaced when the wheel 7 rotates. If the motor 12 and the wheel 7 are displaced to the left by the bar 13, from the position indicated in FIG. 1, the effective radius between the wheel 7 and the pressure bar 8 increases, and thus accelerates the motion of the burner 2.

There is one more motor 16, a fixed one, which serves for displacing the wheel 7 together with the motor 12. This is done by turning the arm 17 which carries a roller 18 which is so arranged as to move in the slot guide 19 fastened to the arm 13. The center of the roller 18 describes a circular trajectory passing through the points 20, 21, 22, 23 and 24, there being an angular distance of 30° between successive individual points. If the motor 16 is at rest, the roller 18 is in the starting position 20. With a certain constant angular speed of the motor 16, the roller 18 is moved from position 20, over position 21, etc. to the position 24. The efficient contact radius between the wheel 7 and the pressing bar is large in the beginning but gradually decreases to 0, which is the case when the roller 18 reaches the position 22. Then the process becomes reversed, and the effective contact radius between the wheel 7 and the pressure bar 8 increases.

FIGS. 2 and 3 represent a simplified diagrammatic survey of the geometric and kinematic relations of the above-described driving mechanism of the device. In such figures:

*t* designates time,

*w* is the constant angular velocity of the rotating arm 17,

*o* is the length of the arm 17,

V is the shifting speed of the bar 13,

A is the length of the trajectory of the bar 13,

W is the constant angular velocity of the rotating wheel 7,

R is the length of the arm of the effective contact radius between wheel 7 and bar 8, and B is the length of the trajectory of the burner 2.

In order to simplify the geometric relations, it will be assumed that the circle described by the center of the roller 18 which passes through the positions 20, 21, 22, 23 and 24 can be replaced, in its useful part, by a parabola closely joined to the circle. Thus we can omit the difficult-to-survey relation containing trigonometric functions, the resulting slight inaccuracy being within permissible tolerances for the purpose.

The final result corresponding to the function of the described mechanism, i.e. the relation between the path B of the burner 2 and time t, is expressed here by means of a cubic parabola as illustrated in the lowest part of FIG. 3. From this, there also follows the relation between the speed of the burner and the time which could be represented by a parabola but is not shown here.

FIG. 4, which is aligned with FIG. 3, illustrates diagrammatically a weld head with crack.

FIG. 5 illustrates another mechanism which can be used to perform the method of the invention. In this mechanism, the burner is moved in such a way that the relation between the path B of the burner and time can, in an ideal case, be represented by two mutually linked sections of two opposite square parabolas represented in FIG. 10. The curve expressing the time-dependence of the welding speed then, in an ideal case, consists of two half-lines intersecting each other at the point corresponding to t=0.

In FIG. 11 which is aligned with FIG. 10, a weld bead with crack is represented diagrammatically.

FIG. 5 shows a burner 2 and a shifting bar or slidable rod 4 which carries the burner. The bar 4 is supported in guide boxes 5. The shaft 25 is driven by a motor (not shown) at constant speed. The rollers 26 and 27 are fastened to the shaft 25, entrainer or abatement bars 28 and 29 are fixed to the slidable shifting bar 4.

In this case, the successive stages of the motion are represented in FIGS. 5, 6, 7, 8 and 9. First the roller 26 engages bar 28 and shifts the bar 4 to the right, its speed continuously decreasing to zero. The situation at this moment is represented in FIG. 7 where the roller 26 stops acting upon bar 28 while the roller 27 starts operating upon the bar 29. The shifting speed of the bar 4 then increases again until the state shown in FIG. 9 is reached, whereupon the test is stopped by turning off the motor and switching off the melting arc.

The curve expressing the real relation between the path B of the burner and the required time comprises two sections of cosine curves, and the curve expressing the real relation between the speed of motion of the burner and time comprises two sections of sine curves, not shown here.

The mechanism shown in FIGS. 5 to 9 is simpler than that shown in FIGS. 1 to 4, but permits only a smaller range of the values of the welding speed to be achieved when one and the same bead is to be formed. It is to be noted that as shown in FIGS. 3, 4, 10 and 11 the welding speed varies from 0 to 1.0.

Results similar to those obtained from the mentioned mechanisms are achieved by the mechanism represented in FIGS. 12 to 19. Its fundamental part is the cylinder 30 which lies freely on a fixed plane supporting surface 31 and can roll upon it. By pressing a rolling bar 32 from above against the cylinder 30 and by moving the bar 32 parallel to the plate 31, the cylinder is shifted in the direction of the arrow B. The speed of shifting cylinder 30 is constant and is suitably derived from a driving motor (not shown). The rolling bar 32 is supported in guide boxes 33. During the rolling of cylinder 30, each point of the circumference of the cylinder describes a cycloid 34 (FIG. 12). From the cycloid 34, there is derived the motion of the burner 2 in the direction of the arrow B. This is done by means of a roller 35 attached to the cylinder 30. The center of a roller 35 describes the mentioned cycloid. A shifting bar 36 supported in guide boxes 37 takes over from the roller 35, the motion component in the direction of the arrow B, by means of an entraining rod 38.

FIGS. 13 to 19, inclusive, show successive positions of the parts in intervals of one-sixth of a revolution of the cylinder 30. The speed of the motion is a minimum near the point of the cycloid shown in FIG. 16. With increasing distance from this point, the speed of the burner with respect to the specimen as required for the test. From the above mentioned examples it is evident that the principle of the invention can be carried out by various kinds of driving mechanisms.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. A method testing the weldability of metallic materials based on the criterion of hot cracking tendency in the process of welding, comprising employing a test body with a smooth surface with no joints to be welded, melting the test body during the test by means of a heat source in such a way as to form a weld bead, and intentionally changing the welding speed during the formation of the weld bead while maintaining the heat output of the heat source unchanged examing the thus-formed weld bead for cracking.

2. A method according to claim 1, wherein the test bead is formed solely of metal melted from the test body.

3. A method according to claim 1, wherein the weld bead is formed by moving a welding burner with respect to the test body.

4. A method according to claim 1, wherein the welding speed is continuously changed from its initial value during a substantial portion of the total length of the weld bead.

5. A method according to claim 1, wherein the relation between the welding speed and the time which elapses from the beginning of the formation of the weld bead is graphically represented by a parabola.

6. A method according to claim 1, wherein the welding speed is first decreased from its initial value and having reached a minimum rises until it reaches a maximum.

7. A method according to claim 1, wherein the welding speed is first increased from its initial value until it reaches a maximum.

8. A method according to claim 1, wherein the weld bead has a variable width and also varies with respect to the depth of its penetration into the test body along the length of the weld bead, the width and depth of melting and the cross-section of melting being greatest at places where the welding speed was lowest, and the width and depth of melting and the cross-section of melting being the smallest where the welding speed was greatest.

* * * * *